Jan. 29, 1957  D. J. KOHSIEK  2,779,397
PNEUMATIC POWER ACTUATED TUBELESS TIRE BEAD BREAKER
Filed Dec. 22, 1955
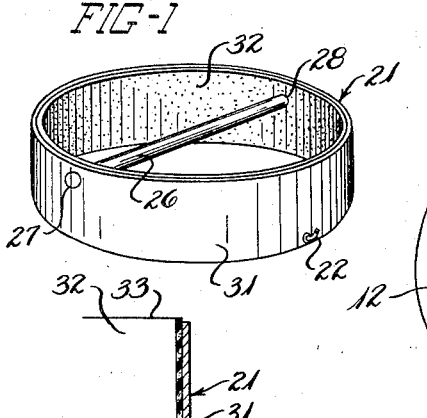
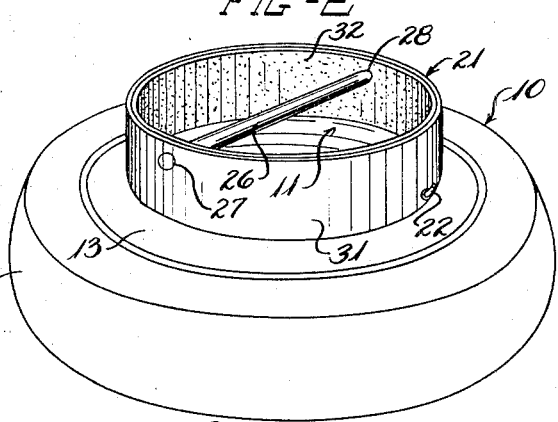
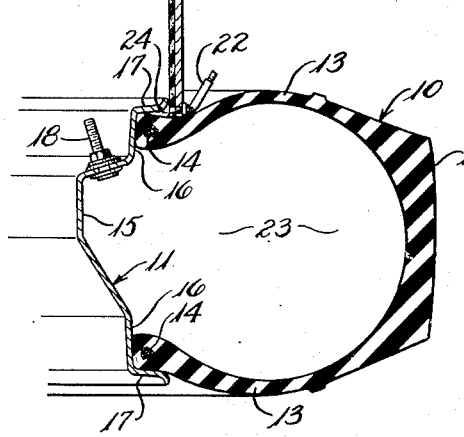
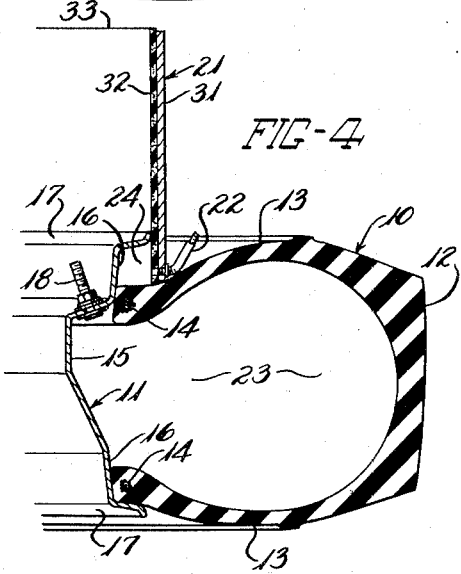
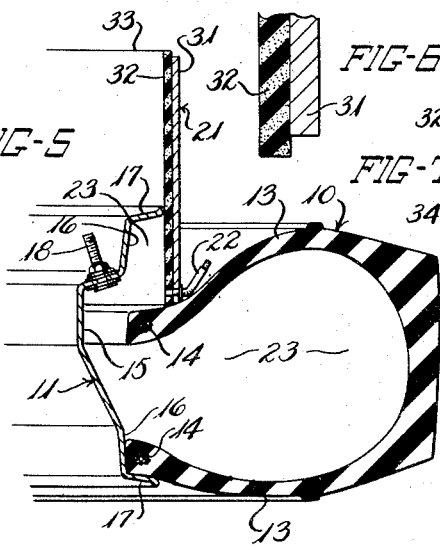
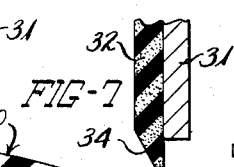
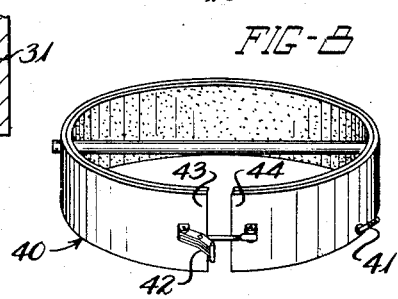
INVENTOR.
DONALD J. KOHSIEK
BY
W. A. Fraser
ATTY.

United States Patent Office 2,779,397
Patented Jan. 29, 1957

2,779,397

PNEUMATIC POWER ACTUATED TUBELESS TIRE BEAD BREAKER

Donald J. Kohsiek, Akron, Ohio, assignor to The Firestone Tire & Rubber Company, Akron, Ohio, a corporation of Ohio Application December 22, 1955, Serial No. 554,839

2 Claims. (Cl. 157—1.1)

The present invention relates to tire tools and more particularly to an improved apparatus for breaking tire beads loose from rim bead seats.

It has become apparent with the increased acceptance of tubeless tires, that the means presently available to force the beads of a tubeless tire away from their rim bead seats are inadequate and damaging to the tire. To break the beads loose from the rim after deflation, present tire dismounting devices and tools rely on wedging action applied between rim flange and tire bead, or on axial pressure exerted on the tire sidewall adjacent the rim flange. The former method usually results in damage due to gouging, tearing and cutting of the outer surfaces of the beads, thus destroying the air-holding properties of the tubeless tire, while the latter method is inadequate for the loosening of tires having flexible sidewalls, and where a tight fit exists or has developed between bead and bead-seat.

The co-pending applications of Alexander J. Varvaro, Serial No. 452,328, filed August 26, 1954, and of Donald J. Kohsiek and Frank F. Ake, Serial No. 468,677, filed November 15, 1954, now both abandoned, show a device to aid in the inflation of a tubeless tire, comprising a cylindrical ring or sleeve which can be telescoped over the side flange of a rim and moved into sealing contact with the adjacent sidewall of a tire to create a closed chamber, which will retain air and at the same time create a set of unbalanced forces on the sidewall to cause it to move into position on the bead seat.

The present invention comprises a modification of such sleeves which is effective in dismounting tire beads from their respective rim bead seats without damaging the tire sidewalls and beads.

An object of the present invention, therefore, is to provide inexpensive, efficient and reliable means whereby tire beads may quickly and easily be removed from their bead seats.

Another object of the invention is to provide means for loosening tire beads from their bead seats which will function equally well with all rims and tires.

A further object of the invention is to provide means for removing tubeless tire beads from their respective rim bead seats in a safe manner so that the sealing properties of the tire beads are not impaired.

These and other objects and advantages of the present invention will be more apparent from the following description of several forms of the invention, reference being had to the accompanying drawing in which:

Figure 1 is a perspective view of the tire bead breaker in sleeve form, embodying the present invention;

Figure 2 is a perspective view showing a tubeless tire mounted on a rim together with the sleeve of Figure 1 fitted over and about the rim and in contact with the tire, the parts being shown at the beginning of the bead breaking operation;

Figure 3 is a fragmentary sectional view taken in a radial plane of Figure 2 and showing on an enlarged scale the relative positions of the parts at the beginning of the bead-breaking operation;

Figure 4 is a fragmentary sectional view similar to Figure 3, showing the relative positions of the parts as the bead is forced down and out of contact with the rim bead seat;

Figure 5 is a fragmentary view, similar to Figures 3 and 4, showing the relative positions of the parts just as the bead breaks free of the bead seat;

Figure 6 is an enlarged fragmentary section of the edge portion of the sleeve of Figures 1 through 5, showing the construction of the sleeve;

Figure 7 is a view similar to Figure 6, showing a modified form of the invention; and Figure 8 is a perspective view of a modification of the invention.

The invention is described with reference to a tubeless tire 10 which is shown mounted on a drop-center rim 11 in Figure 2. The tire is of conventional construction comprising a tread 12, sidewalls 13, and beads 14. The rim 11 is likewise conventional, comprising a drop-center well 15, tire bead seats 16, and side flanges 17. An inflation valve 18 is secured to the rim in an air-tight manner.

The difficulties encountered in forcing the beads of tubeless tires from their rim bead seats by prior methods is overcome by the present invention, which comprises a cylindrical sleeve 21 having a sufficiently large diameter to enable it to slide easily over the side flange 17 of the rim, said sleeve having a length which enables it to contact the adjacent sidewall 13 of the tire 10 while still remaining in contact with the edge of the side flange; see Figures 3–5 inclusive. When the sleeve is in the position shown in Figure 3, it defines an annular closed chamber 24 bounded by the rim flange, the outside surface of the bead and the lower marginal portion of the sleeve spanning the distance between the side flange and the tire. A valve 22 extending through the sleeve adjacent the bottom edge communicates with the chamber 24.

In use, the tire is first deflated, so that the pressure within the chamber 23 is substantially equal to that of the surrounding atmosphere; air is introduced through valve 22, while the sleeve is held in firm sealing contact with the tire sidewall by manual pressure exerted on a bar 26, secured to the sleeve at 27 and 28. Air pressure rapidly builds up within the chamber 24 causing the bead to move away from the rim flange and along the bead seat 16, while the sleeve is made to follow the downward movement of the sidewall by means of pressure on said bar. This substantially air-tight chamber is continuously defined until the bead in its downward movement breaks free from contact with the bead seat, as shown in Figure 5.

Preferably, the sleeve 21 comprises a sheet metal ring 31 the inside of which is permanently covered with a layer of resilient, compressible material 32, said layer having a thickness of about ¼″ to ⅜″ and having margins 33 extending preferably beyond the edges of said metal ring providing a resilient cushion to improve sealing contact of said sleeve with the sidewall of the tire; see Figures 3, 4 and 5. The inside diameter of the sleeve and the compressibility of the layer 32 are such as to permit the sleeve to be used with rims of the same nominal size having a minimum side flange diameter as well as with rims of maximum diameter, the differences in diameter being compensated for by the varying compression in said layer. Thus the sleeve can be used universally with all rims of the same nominal size, within the range of manufacturing tolerances for such rims.

It is, of course, not necessary that the sleeve have the particular construction above. To provide for a larger chamber 24, the margins of sealing layer 32 may be bevelled outwardly as at 34, as shown in Figure 7.

In other cases, the metal ring may be omitted and the sleeve may be molded entirely of a suitable material such as hard rubber or plastic, provided it has sufficient strength to contain the air pressure.

A modification allowing further ease in handling is shown in Figure 8, wherein the sleeve comprises a split, cylindrical, lined ring 40, an inflation valve 41, and a toggle closure 42, whereby to bring together the ends 43 and 44 to form the split ring into a closed cylindrical form.

It will be apparent that the device of the invention may be used as an inflating aid as well as a demounting device. To do so, the sleeve is placed in the position shown in Figure 5, with tire inflation valve 18 in its normal closed position. Air is introduced through the inflation valve 22 into the closed chamber 23 defined by the drop-center rim 11, the tire 10, and the lower portion of the sleeve spanning the distance between the rim flange and the tire. As the air pressure continues to build up within this closed chamber, it will finally overcome the other forces acting on the sidewall and cause it to move up into contact with the bead seat, as shown in Figure 4. At this point, no more air is supplied through inflation valve 22, and tire inflation is completed through tire inflation valve 18 in the rim.

Various other modifications will undoubtedly occur to those skilled in the art without departing from the spirit and scope of the invention, the essential features of which are summarized in the claims below.

I claim:

1. A device to break the beads of a tire from their seats on a rim, said device comprising a sleeve with an inside diameter having a sliding fit over the side flange of said rim, said sleeve having a length sufficient to span the distance between the adjacent sidewall of said tire and said side flange when said sleeve is telescoped over said rim flange and is positioned with one edge in contact with the sidewall of said tire, whereby said rim flange, tire sidewall, and sleeve comprise a closed chamber adapted to hold air under pressure, and a conduit for introducing air under pressure into said closed chamber.

2. A device to break the beads of a tire from their seats on a rim, said device comprising a sleeve having an internal coating of compressible material, with an inside diameter having a sliding fit over the side flange of said rim, said sleeve having a length sufficient to span the distance between the adjacent sidewall of said tire and said side flange when said sleeve is telescoped over said rim flange and is positioned with one edge in contact with the sidewall of said tire, whereby said rim flange, tire sidewall, and sleeve comprise a closed chamber adapted to hold air under pressure, and a conduit for introducing air under pressure into said closed chamber.

References Cited in the file of this patent

UNITED STATES PATENTS

| 2,394,290 | Butler | Feb. 5, 1946 |
| 2,418,849 | Polt | Apr. 15, 1947 |